United States Patent [19]
Donovan et al.

[11] Patent Number: 5,888,648
[45] Date of Patent: *Mar. 30, 1999

[54] MULTI-LAYER HERMETICALLY SEALABLE FILM AND METHOD OF MAKING SAME

[75] Inventors: Kevin M. Donovan, Pittsford; Dan-Cheng Kong, Fairport; Leland Liu, Fairport; Donald F. Sexton, Fairport, all of N.Y.; Tien-Kuei Su, Belle Mead, N.J.

[73] Assignee: Mobil Oil Corporation, Fairfax, Va.

[ * ] Notice: This patent issued on a continued prosecution application filed under 37 CFR 1.53(d), and is subject to the twenty year patent term provisions of 35 U.S.C. 154(a)(2).

[21] Appl. No.: 706,325

[22] Filed: Sep. 12, 1996

[51] Int. Cl.⁶ .................................................. B32B 7/12
[52] U.S. Cl. ......................... 428/349; 428/347; 428/515; 428/516; 428/483
[58] Field of Search .................... 428/349, 347, 428/516, 517, 515, 483

[56] References Cited

U.S. PATENT DOCUMENTS

| | | |
|---|---|---|
| 3,202,528 | 8/1965 | James . |
| 4,020,228 | 4/1977 | Eastes . |
| 4,121,956 | 10/1978 | Sample . |
| 4,218,510 | 8/1980 | Willson . |
| 4,294,882 | 10/1981 | Andrews et al. . |
| 4,347,337 | 8/1982 | Knott, II . |
| 4,384,024 | 5/1983 | Mitchell et al. ......................... 428/349 |
| 4,389,450 | 6/1983 | Schaefer et al. . |
| 4,582,752 | 4/1986 | Duncan . |
| 4,702,954 | 10/1987 | Duncan . |
| 4,966,795 | 10/1990 | Genske et al. . |
| 5,049,436 | 9/1991 | Morgan et al. . |
| 5,153,074 | 10/1992 | Migliorini . |
| 5,192,620 | 3/1993 | Chu et al. . |
| 5,221,566 | 6/1993 | Tokoh et al. . |
| 5,346,763 | 9/1994 | Balloni et al. ......................... 428/516 X |

FOREIGN PATENT DOCUMENTS

267032  10/1989  Japan .

*Primary Examiner*—David Zirker
*Attorney, Agent, or Firm*—Ronald A. Bleeker; Dennis P. Santini; Romulo H. Delmendo

[57] ABSTRACT

The present invention is a multi-layer film which has an improved composite structure for providing hermetic seals to packages manufactured in high speed packaging apparatus. The structure of the multi-layer film of the present invention includes a main substrate and a sealant layer. The sealant layer, in turn, includes two components, an intermediate layer which has the primary function of compliance during sealing, and a sealing layer which has the primary function of providing adhesivity to the completed seal. As a result of this invention, high strength hermetic seals can be provided to multi-layer films effectively and efficiently, and hermetic seals are provided with the ability to be peeled open without destruction of several layers of the film.

26 Claims, 4 Drawing Sheets

MULTI-LAYER HERMETICALLY SEALABLE FILM AND METHOD OF MAKING SAME

The present invention relates to the art of packaging using multi-layer films, and, in particular, to a new composite multi-layer film for providing hermetic seals to multi-layer film packages.

Packaging technology has over the years required the development of many disciplines. Currently, packaging technologists integrate elements of engineering, chemistry, food science, metallurgy, and other technologies in order to provide the consumer fresh, healthy food product. In those cases where packages are prepared from multi-layer film, it is desirable to be able to provide a hermetic seal, i.e., a seal which does not permit passage of gas such as air.

In recent years, containers produced out of multiple-layer flexible film, such as bags and pouches, predominate the marketplace. In order to utilize continuous multiple-layer flexible film, the industry generally employs form/fill/seal packaging techniques. The type of product packaged dictates whether or not the technique will include horizontal form/fill/seal packaging (HFFS) or vertical form/fill/seal packaging (VFFS).

In any event, it is important for the packaging artisan to be able to select a multi-layer film having optimum barrier properties for storage of the food items and be confident of providing a high quality seal using high speed packaging apparatus. For example, it is known that stereoregular polypropylene, e.g., oriented polypropylene, is quite useful in the manufacture of packages from flexible films. Using oriented polypropylene as a core layer, additional layers in the way of coatings, co-extrusions, laminations, and combinations thereof are added to improve barrier properties of the film. In certain cases, films can be prepared which exclude moisture and oxygen, but permit the passage of light. In other cases, it is also important to prevent light from passing through the film barrier. Barrier properties can also be modified and/or enhanced by treatments such as heat and flame treatment, electrostatic discharge, chemical treatments, halogen treatment, -violet light, and combinations thereof A primary concern for designing multiple-layer films for packaging is to ensure they can be processed on high speed form/fill/seal machinery. Form/fill/seal package apparatus operates by unwinding continuous film from bulk film rolls, followed by forming pouches therefrom, filling the pouches, and, finally, sealing the pouch closed. Thus, the film must have sufficient flexibility to undergo machine folding from a flat orientation to a folded condition, and be subjected to a sealing function which is part of high-speed packaging apparatus. In selecting the optimum multi-layer film for its barrier properties, high-speed unrolling and folding are the primary concern. An additional, and very important aspect of the packaging process, however, is the ability to effectively seal the pouch after it is filled with the product.

High-speed horizontal and vertical form/fill/seal apparatus include sealing functions at various stages of the packaging process. In a horizontal form/fill/seal apparatus, individual pouches are formed by folding the multi-layer film in half followed by providing vertical seals along the length of the folded web and separating the pouches along the seals formed by vertical sealing. (Optionally, the bottoms of the pouches can also be sealed). After the pouch thusly formed is filled, the top of the pouch is sealed.

Similarly, in vertical form/fill/seal apparatus, the continuous web is formed around a tube and the web is immediately joined together by a longitudinal sealing jaw as either a lap seal or a fin seal. A lap seal is depicted schematically in FIGS. 1 and 1a. A fin seal is depicted schematically in FIGS. 2 and 2a.

A second sealing function is present in a VFFS configuration which consists of a combination top- and bottom-sealing section (with a bag cut-off device in between). The top-sealing portion seals the bottom of an empty bag suspended from the bag forming tube while the bottom portion seals the top of a filled bag.

Figure 3:
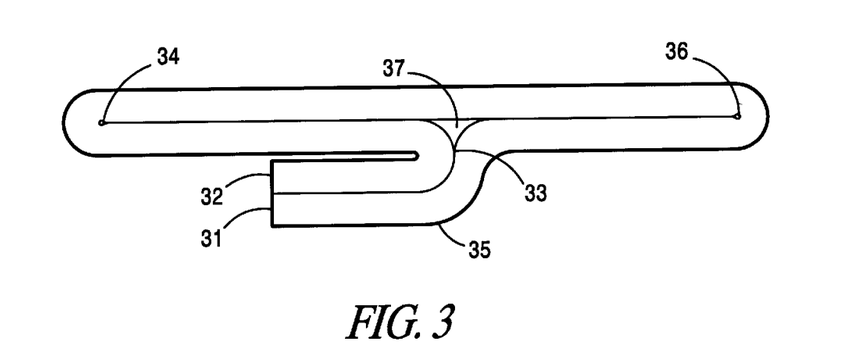
FIG. 3 is an oversized schematic of the seal formed along the bottom of FIG. 2 and shown from the view provided from line 3—3.

As a consequence of processing high-barrier property multi-layer films in high speed form/fill/seal apparatus, a structural phenomenon known as "tunnels" are formed. Tunnels are formed at the overlap of film which occurs when the film is folded, such as at the bottom of pouches formed on HFFS apparatus and at the sides of pouches formed on VFFS apparatus. Tunnels are also formed at the convergence of film web at a fin seal area. The examples of tunnels 34, 36, and 37 are depicted in FIG. 3.

In order, therefore, to provide high-barrier multi-layer film with hermetic seals, several factors must be considered. It is important to provide a sealing capability at as low a temperature as possible in order to retain, among other things, stereoregularity imposed during orientation, little or no film shrinkage, retention of film and/or chemical additive properties, and highly consistent quality sealing capabilities. Furthermore, the film must have surface characteristics which permit it to be readily used on high-speed machinery. For example, the coefficient of friction must be such that it can be readily unrolled from a high volume roll of film and passed through the packaging machinery. Undesirable sticking or friction characteristics can cause bag imperfections and interruption of high-speed processing. Moreover, seals formed during process must have good seal strength.

Figure 8:
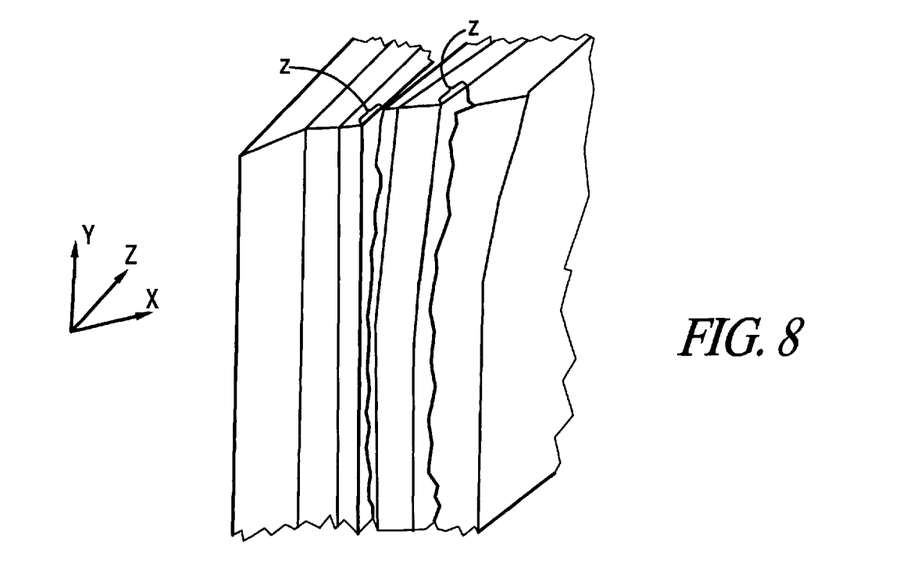
FIG. 8 is a schematic representation of a multi-layer film which exhibits z-direction tear.

Additionally, it is also desirable to have provide seals which can be readily opened by the consumer without creating a "z-direction" tear. A z-direction tear is one which causes the disruption of the integrity of the multi-layer film when the film is pulled apart at the seal. FIG. 8 depicts a z-direction tear. A z-direction tear is one which does not simply separate at the line at which the seal is formed. Instead, the separation extends to layers of the film which ripped along the layers thereof and not simply delaminated one from another. As a result of z-direction tears, it is difficult to reclose such packages to maintain freshness of the contents. When z-direction tears can be eliminated, packages are easily refolded and sealed by a mechanical means such as a clip imposed over the folds of the once-opened package. Z-direction tears can result when the adhesive properties used to seal the package create a tensile strength greater than that required to disrupt the integrity of one or more of the layers of the film web. It is desirable to produce a package which will separate along the seal during opening so that the package can be easily reclosed and secured against passage of air.

More recently, the packaging artisan has been concerned with the ability to provide quality seals which preserve the freshness of the contents while providing the consumer with an easily openable and reclosable container. Innovations to date have been primarily concerned with the components of the seal material. For example, U.S. Pat. No. 3,202,528 to James describes a oriented polypropylene film having an adherent heat-sealable coating which includes a material from the group consisting of copolymers of vinylidene chloride and acrylonitrile, copolymers of vinyl chloride and vinyl acetate, chlorinated rubbers, nitrocellulose and polyamide which melts below 160° C. and an acidic material provided in an amount of about 20 to about 60% by weight of the film forming material. This adhesive is coated and dried on the film. U.S. Pat. No. 4,020,228 to Eastes describes a gel composition which provides a heat sealable surface to polyolefinic materials or cellulosic sheet materials. U.S. Pat. No. 4,121,956 discloses an ionomer adhesive adhered to an outer ionomeric surface of package wrapping for attachment of labels.

U.S. Pat. No. 4,218,510 to Willson discloses a heat-sealable multi-layer film having a polyester layer chemically interfacially bonded to a polyolefinic layer which contains 250 to 750 parts per million of a fatty acid amid. Willson specifically provides that the interfacial bond between the polyester and the polyolefinic layer is so strong that the layers cannot be mechanically separated. It is believed that the Willson '510 seal causes in z-direction tear.

U.S. Pat. No. 4,294,882 discloses an oriented heat-sealable anti-static polypropylene film manufactured by applying to a surface of a base polypropylene film a heat-sealable olefinic polymer containing between 0.2 and 10% by weight of an anionic hydrocarbyl sulfonate. Andrews, et al. also provide that a slip agent can be incorporated for ease of handling.

U.S. Pat. No. 4,389,450 to Schaefer, et al. describes a multi-layer packaging film in which the outer polymeric layers cooperate to provide a relatively constant coefficient of friction differential. This enhances the ability to use the film in high speed processing to form fin seal and lap seals. Schaefer, et al. have addressed the problem of providing the proper coefficient of friction for use of the film in high-speed processing apparatus.

U.S. Pat. No. 5,049,436 to Morgan, et al. discloses a multi-layer film which is hermetically heat sealable over a broad temperature range. The Morgan, et al. patent describes a heat-sealable layer which includes an ethylene-propylene copolyer and/or an ethylene-propylene-butene terpolymer with an inorganic anti-block agent.

While the references set forth above as well as other references and disclosures in the art of film packaging disclose attempts to overcome specific problems identified in high-speed packaging using multi-layer films, none of the references provide a technological solution which simultaneously provides an excellent hermetic seal in all form/fill/seal packaging apparatus while maintaining excellent separation and reclosing characteristics.

Therefore, the present invention is intended to provide an improved multi-layer film structure and a method for improving multi-layer film structures to overcome the problems set forth above and other problems associated with form/fill/seal processing.

SUMMARY OF THE INVENTION

The present invention is a multi-layer film and a method of improving multi-layer films whereby hermetic seals can be simply and efficiently formed and whereby the seal characteristics are significantly improved. As a result of identifying as separate functions, the requirements of filling inter-jaw space and providing an adhesive surface, the inventors herein have enabled the packaging artisan to design highly effective, easily-opened and reclosable seals, i.e., peelable hermetic seals, which can be implemented on existing form/fill/seal apparatus. The sealing and seal improvements of the present invention are especially useful for closing packages in which a multilayer film has been joined by means of fin and lap seals.

The present invention includes a main film substrate, especially oriented polypropylene (and other substrates) characteristically having a stiffness or modulus which prevents or significantly reduces the ability to seal the film together where the film is bent to form overlaps or fins. In a preferred embodiment the main film substrate has good barrier properties and can include a metallized film layer. For example, the substrate can include one or more layers selected from the group consisting of oriented polypropylene, ethylene-propylene copolymers, polyethylene terephthalate, polyamide, polyacrylonitrile copolymer, polyvinylidene chloride, fluoro-polymers, ethyl-vinyl alcohol copolymers, and mixtures thereof. Other layers can be barrier resins, tie resins, metallized film, ceramic deposited film (e.g., $SiO_4$), plasma chemical vapor deposited film, and metal, ceramic, plasma chemical vapor.

Preferred main film substrates used herein are referred to as high barrier and metallized high barrier films. The main film substrate also includes laminates formed from additional outer webs, such as oriented polypropylene (OPP), polyethylene terephthalate (PET), polyamide, polyethylene, and other mono- or multi-layer films.

The present invention also has a sealant layer which is adjacent to and bonded to the main film substrate. The sealant layer includes an intermediate layer, which is directly bonded to the main film substrate, and a sealing layer bonded to the intermediate layer.

The intermediate layer must have sufficient thickness and must have sufficient flow property under sealing conditions to deform and comply with all unfilled space between the sealing jaws during sealing. The term "comply" means to be easily and inelastically forced to occupy all empty space remaining between sealing jaws while the sealing jaws are in the closed or seal position. Polyethylene, and its co- and terpolymers are contemplated for use in the intermediate layer. The intermediate layer material must flow under heat and pressure imposed by jaws of commercial sealing apparatus to occupy all the space between the jaws. The intermediate layer can have a component selected from the group consisting of polyethylene homo-, co-, and terpolymers, amorphous nylon, ionomers, and mixtures thereof Preferably, low density polyethylene is a component of the intermediate layer.

The sealing layer can contain a component which readily forms a seal under sealing heat and pressure conditions. Such components include, but are not limited to, polyethylene homo-, co-, and terpolymers, amorphous nylon, ionomers, and mixtures thereof.

A third element of the present invention is a composite structure wherein the sealant layer has sufficient thickness in relationship to the thickness of the main film substrate to eliminate openings or passages, such as tunnels, which result during sealing. The main film substrate includes all layers of film present in the final product which is to be sealed. Thus, the main film substrate can be a multi-layer co-extruded film or a lamination of more than one extruded film.

In order to determine the minimum sealant layer thickness, a mathematical relationship can be solved to establish the lower limit of the required thickness. The minimum thickness can be found by solving for $S_0$ in the mathematical relationship set forth below:

$$S_0^3 = \left[\left(\frac{2.15}{96}\right)\left(\frac{LW}{L+W}\right)\left(\frac{G'}{T}\right)\right]t^2$$

wherein, $S_0$ (cm) is the sealant layer, t (cm) is total thickness of the composite structure, $G'$ (dynes/cm$^2$) is the storage shear modulus of said sealant layer (G' is temperature and rate dependent)

T (dynes/cm$^2$) is applied compression stress on a seal jaw,

L (cm) is ½ jaw seal length, and

W (cm) is a seal tooth width.

In most cases, it has been found that the sealant layer has a thickness of from about 15% to about 70% of the thickness of the composite structure, and is preferably in many embodiments from about 20% to about 60% of thickness of the composite structure.

Focusing on the sealant layer, it has been found that the thickness of the intermediate layer is from about 10% to about 90% of the thickness of the sealant layer, and is preferably from about 40% to about 80% of the thickness of the sealant layer.

The present invention provides the packaging artisan with the ability to improve total package barrier by eliminating "tunnels" which can be formed at the overlap of film such as at fold locations and at the center lap of a fin seal area.

As a result of the present invention, multi-layer films which are used in packaging can be provided with excellent sealing capability without the necessity of expensive sealants or a thick sealant layer which causes difficulty on high speed packaging machines. Furthermore, the present invention eliminates the need to load silicone in an outer layer or lamination of a multi-layer film structure to facilitate passage through packaging apparatus. The present invention also eliminates inconsistent packaging machine performance.

The present invention also significantly increases seal strength without reliance on a super-adhesive which may not be compatible with high speed processing.

In addition to the advantages set forth above, the present invention has also improved packaging prepared in accordance with the invention by eliminating z-direction tear upon separation of the sealed films. Thus, peelable hermetic seals can be provided.

Other and further improvements which the present invention provides over the prior art will be identified as a result of the following description which sets forth the preferred embodiments of the present invention. The description is not in any way intended to limit the scope of the present invention, but rather only to provide a working example of the present preferred embodiment. The scope of the present invention will be pointed in the appended claims.

BRIEF DESCRIPTION OF THE DRAWINGS

Preferred embodiments of the invention have been chosen for purposes of illustration and description and are shown in the accompanying drawings, wherein.

DETAILED DESCRIPTION OF THE INVENTION

The present invention is a multi-layer film which is hermetically sealable and a method of improving the seal characteristics of multi-layer films which are hermetically sealable in high-speed packaging machines. In order to provide a hermetic seal to packages formed from multilayer films, care must be taken to provide a sealing medium which accommodates the nature of the barrier film used for the package, i.e., its modulus or stiffness, thickness, adversity to temperature and pressure imposed under sealing conditions, etc. "Hermetic seals" as used herein means both peelable and unpeelable seals which provide hermetic barrier properties, i.e., does not permit passage of a gas.

In order to overcome difficulties normally encountered when providing a hermetic seal to multi-layer films, the present inventors have been able to identify separate requirements of the sealing function. In particular, they have identified requirements of both compliance and adhesivity. The present invention is based on the inventors' ability to satisfy these two sealing requirements to provide efficient and effective high performance seals utilizing high speed packaging apparatus.

"Multi-layer film" as used in the present application means a film having more than one layer of material which forms the final film product. For example, while it is known that oriented polypropylene (OPP) is excellent for use in packaging, in order to provide additional barrier properties, it is also known to overlay oriented polypropylene with additional layers of polymers and/or other additives. Such films can be prepared by coextrusion of two or more layers simultaneously, or by extruding subsequent layers in series, or by coating, laminating, or combinations thereof. Multi-layer films of the present invention includes the entire web structure as it is used for packaging. The multi-layer films of the present invention include two components, a main film substrate and a sealant layer.

The inventors have discovered that when a main film substrate is provided with a sealant layer having two separate components, each primarily designed to fulfill one of the required sealing functions, imperfections in hermetic seals normally associated with high-speed film packaging can be effectively and efficiently eliminated. Specifically, a "sealant layer" is provided to a main film substrate. The sealant layer has two components, an intermediate layer and a sealing layer. The "intermediate layer" primarily meets the requirement of "compliance" throughout the volume between the surfaces of sealing jaws of high-speed packaging apparatus during the sealing function. The "sealing layer", on the other hand, primarily meets the requirement of providing high performance adhesion under sealing conditions. Bearing in mind that sealing conditions include both high temperature and pressure imposed on the sealant layer, both the intermediate layer and the sealing layer will participate in both of the sealing functions, i.e., compliance and adhesion. However, the primary function of the intermediate layer is to provide compliance while the primary responsibility of the sealing layer is to provide adhesivity. Thus, the composition of the intermediate layer is different from the composition of the sealing layer.

The sealant layer is provided to the main film substrate such that the intermediate layer is adjacent to and bonded directly to the main film substrate while the sealing layer overlays and is the outermost skin of the sealant layer. Since the primary function of the intermediate layer is compliance between the sealing jaws, the intermediate layer must have two attributes to fulfill its function, sufficient thickness and a flow property to comply with the space between the jaws.

"Compliance" in the context of the present invention means the ability to be easily and non-elastically deformed to fill and conform to the entire space between the sealing surfaces of a sealing jaw. Sealing jaws can operate from a temperature of from about 120° C. to about 190° C., and normally are imposed on a film packaging material at a pressure of from about 120 psi to about 180 psi.

Figure 9:
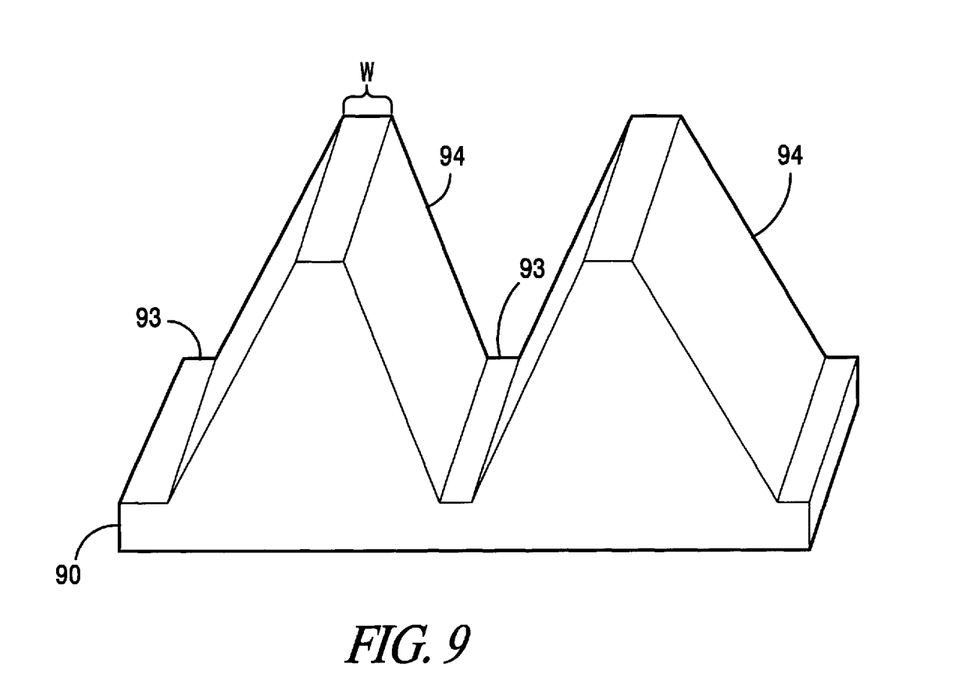
FIG. 9 is a cross-section of a portion of a seal jaw which depicts the shape and dimension of seal jaw teeth.

Sealing jaws can be flat, or, in many cases, are provided with teeth. In FIG. 9, a section of a sealing jaw 90 having teeth 94 is schematically depicted in perspective. The jaw 90 is formed with teeth 94 having tooth width W. A complementary jaw is used in conjunction with jaw 90 so that the peak of the teeth mesh with the valleys 93 of the jaw. The surfaces of the jaws close in the sealing position on two multi-layer films, thereby clamping the films therebetween. To form a hermetic seal, the volume between the surfaces must be completely filled during sealing. These are the normal sealing conditions under which the intermediate layer must be capable of compliance.

The intermediate layer must have sufficient material to undergo compliance without leaving a void. Thus, the thickness of the intermediate layer must be such that a continuum of material is provided throughout the space between the surfaces of the sealing jaw. The flow property of the intermediate layer must be such that in the presence of the temperature and pressure exerted during sealing, the material maintains a viscosity which is easily deformed but maintains a non-interrupted mass throughout the space between the sealing surfaces.

Linear low density polyethylene (LLDPE) has been found to be an excellent component for the intermediate layer. Linear low density polyethylene is inexpensive and has the correct compliance requirements for the intermediate layer. Linear low density polyethylene used in the intermediate layer can be used alone or in combination with other components such as a random copolymer of ethylene and propylene or a random terpolymer of ethylene-propylene-butylene (EPB).

The sealing layer of the sealant layer, in turn, has the primary responsibility of providing adhesivity. Thus, sealing layer components should be selected based on their ability to provide good adhesive seal strength, i.e., adequate tensile strength of the seal. Inasmuch as the primary function of the sealing layer is that of adhesivity, the thickness of the sealing layer is less than the thickness of the intermediate layer. It has been found that ethylene-propylene random copolymers, ethylene-propylene-butene random terpolymers, and ethylene-butene polymers referred to as metallocene plastomers prepared by a metallocene catalyst are excellent for use as the primary component in the sealing layer.

In order to enable the sealant layer to fulfill the two functions simultaneously during the act of sealing, the present invention must include a "composite structure" which establishes a relationship between the sealant layer and the main film substrate. The term "composite structure" is used herein to refer to the relationship of the thickness of the sealant layer to the thickness of the main film substrate. Basically, the thickness of the sealant layer must be sufficient in relationship to the thickness of the main film substrate to ensure compliance and total uninterrupted surface-to-surface contact of the sealing layer.

Generally, the film which is overlapped by being folded or bended back on itself forms "tunnels." "Tunnels" are the passages which remain at the folds or bends of the film even after sealing. Tunnels also occur at the convergence of multi-layer film at a fin seal area. (See tunnel 37 at FIG. 3). When the multi-layer film is thinner, the tunnels formed at the bends are smaller. The thicker the multi-layer film, the greater the dimension of the tunnels formed by bends and convergence. Thus, as the thickness of the multi-layer film increases, the sealant layer thickness must also be increased to ensure compliance and surface-to-surface contingency.

The minimum required thickness for any multi-layer film can be found by solving for $S_0$ in the mathematical relationship set forth below wherein $$S_0^3 = \left[ \left( \frac{2.15}{96} \right) \left( \frac{LW}{L+W} \right) \left( \frac{G'}{T} \right) \right] t^2$$

wherein, $S_0$ (cm) is said sealant layer thickness, t (cm) is total thickness of the composite structure, G' (dynes/cm$^2$) is the storage shear modulus of said sealant layer (G' is temperature and rate dependent)

T (dynes/cm$^2$) is applied compression stress on a seal jaw,

L (cm) is jaw seal length, and

W (cm) is a seal tooth width. Please note that the thickness of the composite structure, t, is the thickness found after all layers of the final film product are added. Thus, if an initial film web is formed by coextrusion of the sealant layer in combination with one or more additional layers which do not comprise the entire multi-layer film, the total thickness, t, of the composite structure cannot be calculated until the additional layers are added by extrusion, lamination, coating, or otherwise.

Figure 1:
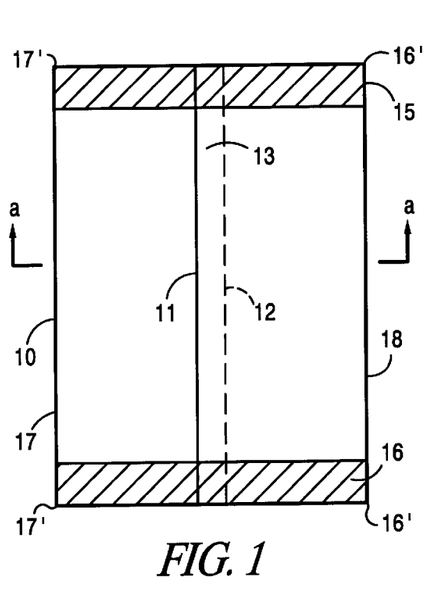
FIG. 1 is a schematic representation of a flexible multi-layered film package formed on a vertical form/fill/seal apparatus and joined by a lap seal.
Figure 1A:
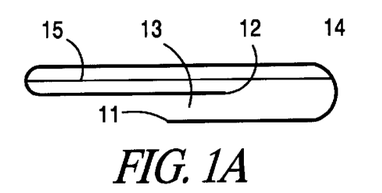
FIG. 1a is a schematic cross-section taken along line a—a of the package depicted in FIG. 1 wherein the lap portion of the seal is exploded for illustration.

Referring now to the drawings, the present invention is explained in relationship to lap seal and fin seal packages. FIG. 1 is a schematic representation of a package 10 formed by closing a multi-layer film by a lap seal. A multi-layer film web 14 has been closed to form the package 10 by joining web edges 11 and 12 at an overlap 13. FIG. 1a is a cross-section schematic of a view taken from line a—a in FIG. 1 which shows the overlapping relationship of the edges 11 and 12. The package is also depicted schematically as being sealed at either end by top seal 15 and bottom seal 16. This type of package is formed on a VFFS apparatus and tunnels will be formed in the ends 16' and 17' of seals 15 and 16.

Figure 2:
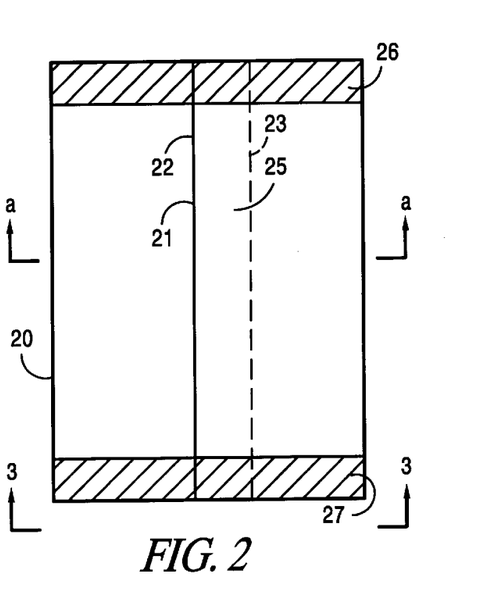
FIG. 2 is a schematic representation of a package formed on a VFFS apparatus which includes a fin seal closure.
Figure 2A:
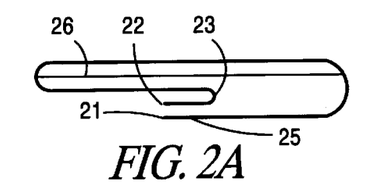
FIG. 2a is a cross-section of the package shown in FIG. 2 taken along line a—a wherein the fin seal is exploded for illustration.

Similarly, FIG. 2 and 2a depict a package formed on a VFFS machine by the formation of a fin seal 25. The fin seal 25 is formed by web edges 21 and 22 together and bending the joined ends back towards the package at bend 23 to form the fin seal 25. The package is also depicted as having end seals 26 and 27 at the top and bottom thereof, respectively.

In order to clearly depict the phenomenon of tunnels formed during sealing, reference is made to FIG. 3 which is an oversized end view of the fin seal package shown in FIG. 2 and taken along lines 3—3. From this end view, the fin seal 35 can be seen as formed by joining edges 31 and 32 and bending the joined portion thereof at bend 33. As the end is sealed, the thickness dimension and stiffness of the film create tunnels 34 and 36 at each edge of the package, while yet another tunnel 37 is formed at the convergence of the multi-layer film at the fin seal area.

Measures have been taken in the past to accommodate the closure of such tunnels. Such measures include the use of relatively expensive components to form the seal skin or layer. For example, cast or extruded polypropylene (which is not oriented) can be used to fill the tunnels. However, cast polyproylene is relatively expensive and creates other difficulties with respect to high speed packaging machine processing. Furthermore, expensive high performance adhesives have been used in the past which also create difficulty with respect to manufacturing efficiency as well as processing through high speed packaging apparatus, and can create environmental difficulties.

Figure 4:
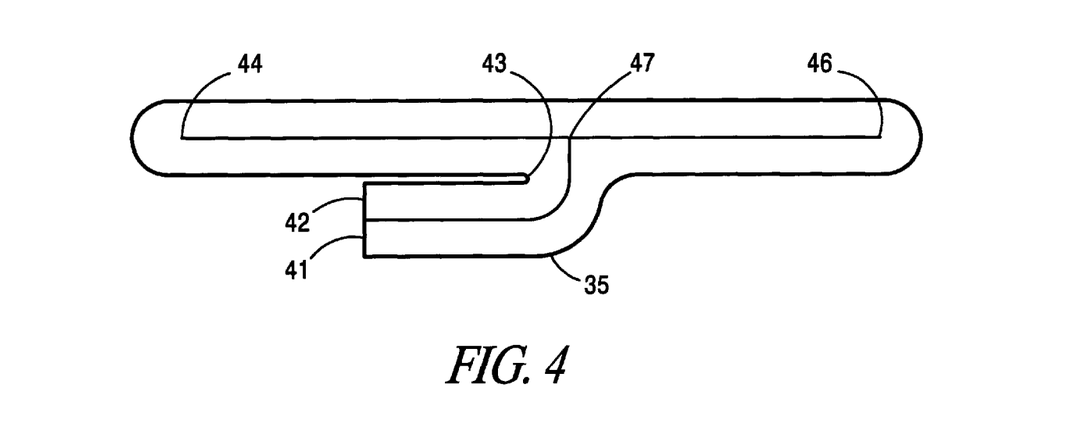
FIG. 4 is a schematic representation of the view depicted in FIG. 3 in which a seal has been made of a film prepared in accordance with the present invention.

Preparation of a package in accordance with the present invention eliminates the tunnels normally associated with sealing the package ends of continuous high speed packaging systems. In FIG. 4, a package prepared in accordance with the present invention is schematically depicted with a view similar to that shown in FIG. 3. Specifically, the edges of a multi-layer film 41 and 42 have been joined and lapped back at bend 43 to form a seal fin. Tunnels usually formed as a result of sealing the end of a fin seal package have been eliminated. Thus, the tunnels found at ends of the seal found at side bends 44 and 46 have been completely closed. Similarly, the convergence 47 of the multi-layer film to form the fin seal shows the elimination of the tunnel depicted at convergence 37 in FIG. 3.

Figure 5:
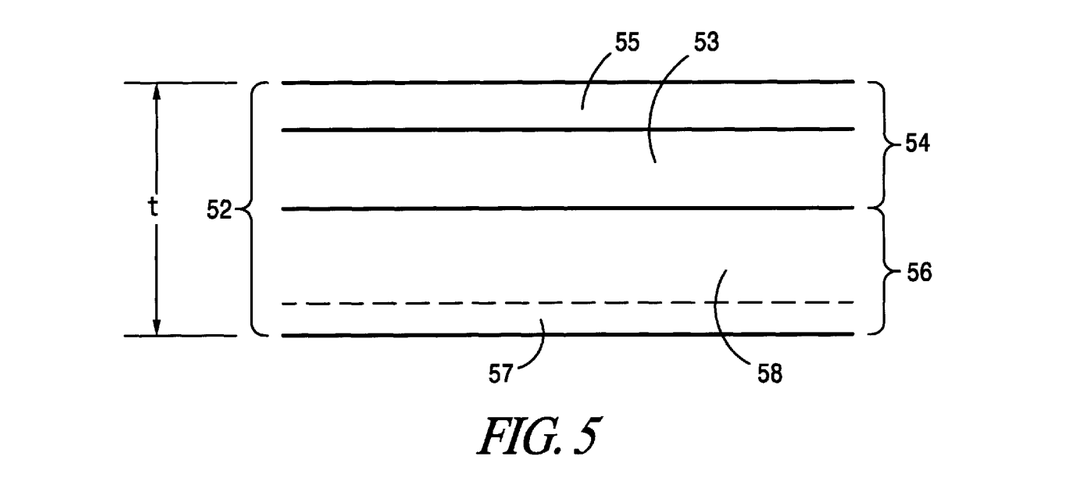
FIG. 5 is an exaggerated cross-section of a multi-layer film prepared in accordance with the present invention.

Referring to FIG. 5, the structural relationship of films prepared according to the present invention in its most basic aspect is schematically depicted. The composite structure 52 is shown as having a thickness t. The composite structure includes a relationship between the sealant layer 54 and the main film substrate layer 56 which is sufficient to ensure both i) compliance by operation of intermediate layer 53, and ii) sealing by sealing layer 55. The main film substrate is simply depicted as having at least one layer 58 and possibly an additional layer 57. In its simplest manifestation, the overall composite structure 52 can include, for example, an oriented polyproylene which makes up the entire main film substrate 56. Optionally, an additional high density polyethylene (HDPE) can be provided as a layer 57. The intermediate layer 53 can also be, for example, a single component, such as linear low density polyethylene, and a sealing layer 55 can be composed of an ethylene-propylene-butene EPB random terpolymer as the sole component.

MAIN FILM SUBSTRATE

The main film substrate of the present invention can be those single or multiple-layer films used in the art of packaging in order to provide simple or enhanced barrier properties for maintenance of package contents. For example, the main film substrate can include oriented polypropylene, and additional layers, such as high density polyethylene, can be coextruded with the oriented polypropylene. Layers which provide additional moisture, oxygen, and light barrier properties, can also be included in the main film substrate.

For example, high barrier film can be provided which includes a substrate made of a propylene homopolymer or copolymer, especially oriented polypropylene, which has a surface which also includes a maleic acid anhydride modified propylene homopolymer or copolymer. At least one surface has a skin layer of ethylene vinyl alcohol copolymer.

U.S. Pat. No. 5,153,074 to Migliorini, which is incorporated herein by reference, discloses a high barrier film which has been metallized. The Migliorini '074 patent describes a metallized multi-layer film having a polymer substrate at least one surface of which includes a maleic anhydride modified polypropylene homopolymer or copolymer, and at least one surface having a skin layer thereon of ethylene-vinyl alcohol copolymer, such skin layer having an aluminum layer directly thereon. The ethylene-vinyl alcohol copolymer layer provides excellent oxygen barrier properties and is described as ranging in thickness from 3 to 30 gauge units. The examples describe a film having a total thickness of 80 to 100 gauge units with a 3 to 30 gauge layer of EVOH which constitutes 3% to 37.5% EVOH as a percentage of the total film thickness. Thus, while the Migliorini '074 patent imposes certain chemical and dimension requirements in order to achieve the barrier properties described therein, it does not provide information or recommendation of how to provide a high performance hermetic seal. The present invention can be used in conjunction with Migliorini multi-layer film to provide hermetic sealing capability without detracting from the high quality barrier provided therein. In essence, the present invention provides the artisan with the capability of providing the Migliorini '074 film with a high quality sealing capability which can be provided at a very low cost and high efficiency.

In U.S. Pat. Nos. 4,704,954 and 4,582,752, both to Duncan, an opaque barrier film is disclosed which includes a polymer substrate within which is located a strata of voids and a thermoplastic water vapor transmission layer which can be ethylene-vinyl alcohol copolymer. While the Duncan patents disclose another enhanced barrier property film, they do not describe how to provide a highly effective hermetic seal by use of a sealant layer as described herein. The Duncan patents are incorporated herein by reference, and the inventors contemplate the use of the Duncan films as main film substrates in conjunction with the present invention.

Other high barrier films contemplated for use as a main film substrate include those having an ethylene-vinyl alcohol oxygen barrier layer with or without additives to enhance its barrier properties. U.S. Pat. No. 4,347,337 to Knott, II, discloses such a barrier. The Knott '337 patent is incorporated herein by reference. Another multiple layer film having good barrier properties is described in U.S. Pat. No. 4,966, 795 to Genske, et al., the contents of which are incorporated herein by reference. The inventors also incorporate herein by reference the disclosure of U.S. Pat. No. 5,192,620 to Chu, et al. which discloses a metallized multi-layer film which includes an oriented polymeric substrate having on one surface thereof a coating of a blend of a vinyl-alcohol homopolymer or copolymer and an ethylene-acrylic acid copolymer, the coating blend having a metal layer deposited thereon.

U.S. Pat. No. 5,221,566 to Tokoh, et al. describes a multi-layer film wherein an intermediate of resin is provided which includes ethylene-vinyl alcohol at a rate of 50 to 95% while 50 to 55% to the layer includes an inorganic filler. Inner and outer layers are also provided of a moisture resistant thermal plastic resin. This barrier can also be used as a main film substrate in the present invention, and the Tokoh, et al. '566 disclosure is incorporated herein by reference.

Another barrier which can be used alone or combination with other layers as the main film substrate is a transparent multi-layer film which includes a transparent membrane of silicon oxide to cover one surface of a film comprised of ethylene-vinyl alcohol copolymer wherein the ethylene-vinyl alcohol copolymer has a ethylene content of 20 to 60% at a saponification number of 90% or more. The sum of the absolute values of dimensional deformation is 2% or less in the longitudinal and transverse directions under conditions of 120° C. for five minutes. While the evaporative loss under the same conditions is 1 weight percent or less after three times or more extrusion at least in one direction. The transparent plastic film described above is disclosed in the Japanese Kokai Patent Application No. 1[1989]-267032, which is incorporated herein by reference.

SPECIFIC PREFERRED EMBODIMENTS

HIGH BARRIER EXAMPLE

Specific embodiments have been identified as particularly useful when the present invention is employed. These embodiments are described by reference to FIGS. 6 and 7.

Figure 6:
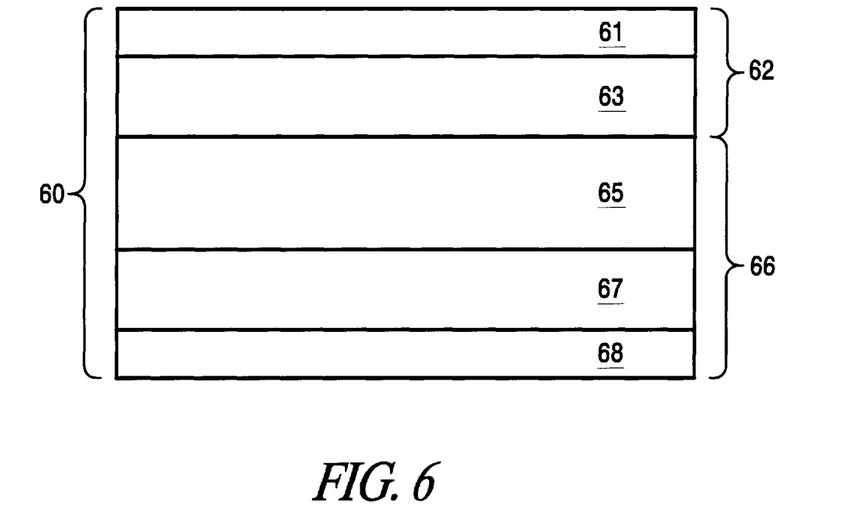
FIG. 6 is also a schematic representation of a cross-section of a preferred film formed in accordance with the present invention.

FIG. 6 depicts a composite structure 60 which includes a sealant layer 62 and a main film substrate 66. The sealant layer 62 includes a sealing layer 61 which is a 5 gauge layer (1 gauge=0.00001")of an ethylene-propylene-butene random copolymer sold under the trade name Chisso 7701 by the Chisso Chemical Company of Japan. The intermediate layer 63 is a 20 gauge layer which includes a combination of a linear low density polyethylene LL3001 sold by Exxon, and the terpolymer Chisso 7701 terpolymer in a ratio of 70:30 LLDPE to EPB copolymer.

The main film substrate 66 is a high barrier film which includes a 62 gauge thick oriented polypropylene layer 65 provided as polypropylene homopolymer Fina 3371 by Fina Oil Company. Immediately adjacent the oriented polypropylene is provided a "tie" resin layer 67. The primary component of the tie layer is an anhydride grafted polyproylene provided by Mitsui under trade name Admer QF500A. The anhydride grafted polypropylene has a melt flow of 3.0 grams per ten minutes and a density of 0.90. The melting point, $T_m$ is 160° C. The tie resin layer is 10 gauge.

Finally, a barrier layer is provided at a thickness of 3 gauge. In this embodiment, the additional barrier layer is ethylene-vinyl alcohol copolymer which includes 48% ethylene. The primary ingredient of this layer is ethylene-vinyl alcohol copolymer having a melt index of 14.0, a density of 1.12 and a melt temperature of 158° C. and is sold under trade designation EC-G156 by Eval. Other barrier resins can include polyvinyl alcohols, polyvinylidine chloride, nylon, liquid crystal polymers, and fluoropolymers.

The sealant layer is 25% of the thickness of the overall composite. The intermediate layer, in turn, is 80% of the thickness of the sealant layer.

HIGH BARRIER EXAMPLE

Another example of a high barrier film with which the present invention can be used is described once again in reference to FIG. 6. In this embodiment, the sealing layer is of the same material and same gauge as in the previous example. The intermediate layer 63 has the same composition, but is a 35 gauge layer rather than a 20 gauge layer. The oriented polypropylene layer 65 has the same composition as in the previous example, but is of 47 gauge rather than 62 gauge. The tie layer 67 and the additional barrier layer 68 have the same composition and dimension as in the previous example. In this second preferred embodiment, the relationship of the thickness of the sealant layer to the composite thickness is 40%. The intermediate layer forms 87.5% of the thickness of the sealant layer.

METALLIZED HIGH BARRIER EXAMPLE

Another embodiment of the present invention includes the use of metallized high barrier films. This embodiment is explained by reference to FIG. 7. The sealant layer 72 includes a sealing layer 71 and an intermediate layer 73. The sealing layer is an ethylene-propylene-butylene (EPB) terpolymer having the same properties and thickness as those described in the previous two examples. The intermediate layer can be a linear low density polyethylene alone or as a blend with an EPB terpolymer in the same proportion and having the same dimension as described above in the previous examples.

Figure 7:
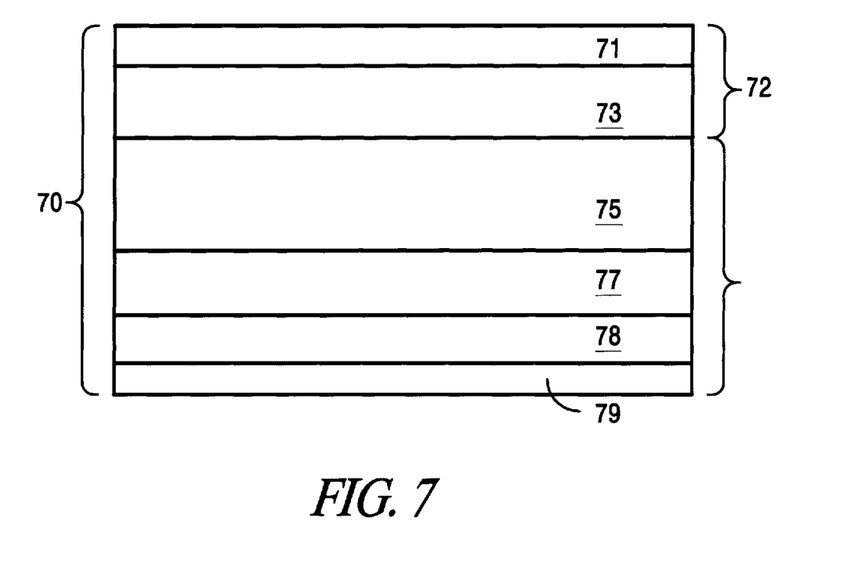
FIG. 7 is another schematic representation of a cross-section of a preferred film formed in accordance with the present invention.

The metallized high barrier main film substrate can include a polypropylene homopolymer core 75 followed by a tie layer 77, another barrier layer 78 and a metal layer 79. The core layer, tie resin layer, barrier layer can be of the same or similar materials and have the same dimensions as described above in the previous high barrier examples. The metallized layer 79 can be aluminum which readily adheres to ethylenevinyl alcohol copolymer such as the layer 78, which has been described in the previous high barrier embodiments.

The composite structure 70 has the same structural relationship of thickness as described in the previous two examples. The metal adhesion assumes virtually no additional thickness since it adheres to and becomes part of the EVOH layer. The optical density achieved using this metallized high barrier film with the present structure is 2.3.

EXAMPLE

The following examples serve to provide further appreciation of the invention, but are not meant in any way to restrict the effective scope of the invention. In the examples set forth herein, which are actual examples, reference is made to FIG. 5 where the sealant layer 54 is composed of a sealing layer 55 and an intermediate layer 53. The main film substrate 56 can include one layer 55 or an additional layer 57. The layers in the following examples have been changed to show the flexibility provided the skilled artisan for implementation of the present invention.

EXAMPLE 1

A multi-layer film was prepared in accordance with the present invention which included a main film substrate having an oriented polypropylene prepared using polypropylene homopolymer Fina 3371 from the Fina Oil Corporation. The OPP layer has a thickness of 45 gauge. Immediately therebelow, the layer 57 was provided at a thickness of 3 gauge using a high density polyethylene M6211 from Oxychem.

The intermediate layer 53 was provided as a 25 gauge thickness of a combination of linear low density polyethylene, LL3001 from Exxon, and EPB terpolymer, Chisso 7510, at a 70:30. The high density polyethylene, polypropylene, and the linear low density/EPB blend were coextruded.

The coextrusion was oriented in the machine direction followed by extrusion of a sealing layer of EPB random copolymer, Chisso 7701 provided by the Chisso Chemical Company of Japan. This layer was provided in a 10 to 20 gauge dimension. The total structure was then oriented in the transverse direction in an oven to provide biaxial orientation.

Continuous samples were run at different thicknesses of sealing layer to provide a composite thickness of between 83 and 93 gauge. Consequently, the composite structure provided a thickness relationship of sealant layer to main film substrate of from 42.2% to about 48.4%, while the intermediate layer ranged from about 56% to about 71% of the sealant layer.

This example provided both high adhesivity as demonstrated by significantly improved seal strength, and fin seal packages were prepared and sealed without the presence of tunnels.

EXAMPLE 2

Another film was fabricated using the same method as set forth in Example 1 and using the same components and layer thicknesses for the main film substrate and the intermediate layer. The sealing layer, however, was provided as a ethylenepropylene random copolymer Fina Z9470HB provided by Fina Oil Company. Samples were prepared once again at a varying thickness level of from 10 to 20 gauges. The composite structure of the film prepared from Example 2 had the same range of thickness relationships as those prepared in Example 1.

EXAMPLE 3

Example 3 was prepared in the same method as Example 1 and each of the layers were made of the same materials and of the same thickness as in Example 1, with the exception that the sealing layer was prepared with a metallocene plastomer SLP9045 provided by Exxon. Metallocene plastomer is a ethylene-butene polymer system which is prepared with a metallocene catalyst. The composite structure of the film prepared in accordance with Example 3 had the same ratio of thickness relationships as those set forth in Examples 1 and 2.

EXAMPLE 4

Yet another example was prepared in accordance with the method set forth in Example 1 and using the same components and thicknesses as in Example 1 except for the sealing layer. The sealing layer was prepared using a polyethylene vinyl-acetate sold under the trade name Elvax 3130SB and is provided by DuPont. The sealing layer, as in the previous examples, was applied by extrusion coating. The composite structure contain the same range of thickness relationships as in the previous examples.

EXAMPLE 5

Example 5 was also prepared using a high density polyethylene as a layer 57 using the HDPE 6211 and the polypropylene Fina 3371 at the same thickness 3 gauge and 45 gauge, respectively as set forth in Example 1. The intermediate layer, however, was made of strictly an EPB random copolymer, Chisso 7701 provided by the Chisso Chemical Company. This layer was provided at a thickness of 25 gauge. The high density polyethylene layer 57, the polypropylene layer 55, and the intermediate layer 53 was coextruded as in Example 1. The coextrusion was machine direction oriented followed by extrusion coating of a sealing layer SLP9045 metallocene plastomer provided by Exxon. The total structure was then oriented in the transverse direction in an oven thereby providing biaxial orientation to the film. The composite structure of the film prepared in Example 5 had the same range of relationships as did those set forth in Examples 1–4.

EXAMPLE 6

In this experiment, a film structure was prepared as in Example 5 except that the sealing layer composition was changed. The sealing layer was made of a blend of metallocene plastomer SLP9045 and EPB random copolymer Chisso 7701 at a ratio of 50:50. The sealing layer was extrusion coated in the same manner as set forth in Example 5. As a consequence, the composite structure had the same relationship of thicknesses as those set forth in the previous example.

EXAMPLE 7

In this example, the same method as previously used was employed to prepare the film. However, in Example 7, the intermediate layer was prepared from a combination of linear low density polyethylene, LL3001, and ethylene-propylene random copolymer, Fina 8573 provided by the Fina Oil Corporation, at a ratio of 70:30. The intermediate layer was, as in the previous examples, prepared at a thickness level of 25 gauge. The sealing layer in Example 7 had the same range of thicknesses of 10 to 20 gauge, and was coextruded as an EPB random copolymer, Chisso 7701. The composite structure of the film prepared in accordance with Example 7 had the same relationship of thicknesses as the previous examples.

EXAMPLE 8

In this example, the main film substrate was the same as in the previous examples. The intermediate layer, however, was a blend of LLDPE, LL3001, and a metallocene plastomer, EXACT 3024, provided by Exxon, in a ratio of 80:20. The sealing layer was provided as before using ethylene-propylene-butylene random terpolymer, Chisso 7701, in the same range of thicknesses, 10 to 20 gauge. Consequently, the composite structure had the same range of thickness relationships as in the previous examples.

EXAMPLE 9

Example 9 was prepared differently from the previous examples in that it contained but one layer 55 as the main film structure. The main film structure contain a single layer 55 of polypropylene, Fina 3371, at a thickness of 45 gague. The intermediate layer was provided at a thickness of 25 gague and was the linear low density polyethylene, LL3001. Finally, the sealing layer was provided as an EPB random terpolymer Chisso 7701 at a thickness range of 10 to 20 gauge. The entire structure was extruded together and oriented in both a machine direction and the transverse direction to provide a composite biaxially oriented multi-layer film. Samples were prepared using the range of gauges of sealing layer so that the composite structure provided a relationship of thicknesses of sealant layer to main film substrate of from about 44% to about 50%. The intermediate layer, in turn, was present in a range of relative thickness to the sealant layer of from about 55% to about 71%.

EXAMPLE 10

Example 10 was prepared similarly to Example 9 except that the intermediate layer was changed from a single linear low density polyethylene component to a combination of LLDPE, LL3001, to low density polyethylene, LDPE, Chevron 1017, at a 70:30 ratio. Otherwise, the thicknesses of each of the layers and the range of thicknesses of the sealant layer were the same as in Example 9. Therefore, the composite structure contain the same relationship of thicknesses as in Example 9.

The films prepared from Examples 1–10 can also be metallized on the high density polyethylene side. Thus, an additional metal layer can be imposed on the multi-layer film. Similarly, additional webs can be laminated to the multi-layer films described in Examples 1–10 to form a new multi-layer film having a different composite structure thickness. Such webs include, but are not limited to, oriented polypropylene, polyethylene terpthalate (PET), nylon, polyethylene, and can be a mono-layer or another multi-layer film. It is important, however, to consider the thickness of the end product film in order to calculate the requisite thickness of the sealant layer.

EXAMPLES OF PREPARED SEALS

EXAMPLE 11

Seals were prepared at a seal temperature of 150° C. and at a packaging speed of 60 packages per minute. The seal jaw frequency of impact was 2.959 per second. The seal jaw pressure was 150 psi. The ultimate laminate thickness, t, of the composite structure was 195 gauge (0.004953 cm). The width of the seal tooth, W, was 0.1 cm. The dimension L, one half of top or bottom seal length of the package in centimeters was 6.35 cm.

A composite sealant layer was provided using LL 3001/Chisso 7510, at a 70:30 ratio, as the intermediate layer and Chisso 7701 as the sealing layer. The G' for the composite sealant layer was $1.3 \times 10^5$ dynes/cm$^2$. The composite sealant layer of thickness was calculated to be 34.85 gauge or 0.000885 cm as a minimum requirement to provide an airtight seal.

Under the same packaging conditions, when G' is $0.443 \times 10^5$ dynes/cm$^2$ for metallocene SLP 9045 polymer as the intermediate layer and Chisso 7701 as the sealing layer, the required minimum thickness was calculated as 24.4 gauge or 0.00062 cm.

EXAMPLE 12

Another example was prepared with the following parameters: a seal temperature of 150° C., a packaging speed 30 packages per minute, seal jaw impact frequency of 1.29 per second, and a seal jaw pressure of 150 psi. The required composite sealant thickness was calculated to be 24.9 gauge (or 0.000632 cm) to provide an airtight seal. The sealant included Chisso 7701 as the sealing layer and LL3001/Chisso 7510 at a 70:30 ratio as the intermediate layer. The G' for this composite sealant is $0.47 \times 10^5$ dynes/cm$^2$. Once again, the width of the seal tooth, W, was 0.1 cm while the dimension L was 6.35 cm.

EXAMPLE 13

Yet another example was calculated at a seal temperature of 140° C. at a packaging speed of 30 packages per minute, seal jaw impact frequency of 1.29 per second, and at a seal jaw pressure of 150 psi. The laminate composite thickness, t, was 195 gauge and the seal tooth width W was 0.1 cm and the dimension L was 6.35 cm. The sealant included a blend of LL3001 and Chisso 7510 at a 70:30 ratio as a intermediate layer, and Chisso 7701 as a sealing layer and the G' for the sealant was $0.66 \times 10^5$ dynes/cm$^2$.

The minimum required thickness of the sealant layer was calculated to be 28.0 gauge or 0.000709 cm in order to provide a hermetic seal.

It should be noted that the heat seal temperature should be above the melting temperature, Tm, for the sealant layer if the sealant layer includes semi-crystal polymers. If the sealants are amorphous polymers such as copolyester or amorphous polyester for polyester film, or amorphous nylon for polyamide film, the heat seal temperature should be above the glass transition, Tg, temperatures of the polymers used in the sealant layer.

Thus, while there have been described what are presently believed to be the preferred embodiments of the present invention, other and further modifications may be made without departing from the spirit of the invention, and it is intended to include all such further modifications and changes as come within the true scope of the invention as pointed out in the appended claims.

What is claimed is:

1. A multi-layer film for forming hermetic seals on packages comprising:
   (a) a main film substrate;
   (b) a sealant layer adjacent and bonded to said main film substrate, said sealant layer comprising,
      (i) an intermediate layer bonded to said main film substrate and having sufficient flow property under sealing conditions to deform and comply with all unfilled space between sealing jaws during sealing, and
      (ii) a sealing layer bonded to said intermediate layer to provide a seal under sealing conditions; and
   (c) a composite structure of said main film substrate and said sealant layer such that said intermediate layer has a composition different than said sealing layer's composition, and said sealant layer has sufficient thickness in relationship to the thickness of said main film substrate to eliminate tunnels from being formed during sealing, whereby hermetic seals are formed during sealing,
wherein the minimum thickness of said sealant layer in relationsip to said main film substrate is detemind by solving for $S_0$ in the following relationship:

$$S_0^3 = \left[ \left( \frac{2.15}{96} \right) \left( \frac{LW}{L+W} \right) \left( \frac{G'}{T} \right) \right] t^2$$

and wherein,
   $S_0$ is said sealant layer thickness,
   t is total thickness of said composite structure,
   G' is the storage shear modulus of said sealant layer (G' is temperature and rate dependent)
   T is applied compression stress on a seal jaw,
   L is ½ jaw seal length, and
   W is a seal tooth width.

2. A multi-layer film according to claim 1 wherein said main film substrate comprises at least one layer selected from the group consisting of oriented polypropylene, polypropylene, ethylene-propylene copolymer, polyethylene terephthalate, polyamide, polyacrylonitrile copolymer, polyvinylidene chloride, fluoropolymer, ethylene-vinyl alcohol copolymer, and mixtures thereof.

3. A multi-layer film according to claim 2 wherein said main film substrate further comprises a layer selected from the group consisting of barrier resins, tie resins, metallized film, ceramic deposited film, plasma chemical vapor deposited film, and metal, ceramic, and plasma chemical vapor.

4. A multi-layer film according to claim 3 wherein said main film substrate is a high barrier film.

5. A multi-layer film according to claim 4 wherein said high barrier film is metallized.

6. A multi-layer film according to claim 2 wherein said main film substrate is a laminate further comprising an outer web selected from the group consisting of paper, oriented polypropylene, polyethylene terephthalate, polyamide, polyethylene, mono- and multi-layer films, and combinations thereof.

7. A multi-layer film according to claim 1 wherein said sealant layer has a thickness of from about 15% to about 70% of the thickness of said composite structure.

8. A multi-layer film according to claim 7 wherein said sealant layer has a thickness of from about 40% to about 60% of the thickness of said composite structure.

9. A multi-layer film according to claim 1 wherein the thickness of said intermediate layer is from about 10% to about 90% of the thickness of said sealant layer.

10. A multi-layer film according to claim 9 wherein said thickness of said intermediate layer is from about 40% to about 80% of said thickness of said sealant layer.

11. A multi-layer film according to claim 1 wherein said intermediate layer comprises a component selected from the group consisting of polyethylene homo-, co-, terpolymers, amorphous nylon, an ionomer and mixtures thereof.

12. A multi-layer film according to claim 11 wherein said component is low density polyethylene.

13. A multi-layer film according to claim 1 wherein said sealing layer comprises a component selected from the group consisting of polyethylene homo-, co-, and terpolymers, amorphous nylon, an ionomer, and mixtures thereof.

14. A method of improving seal characteristics of a multi-layer film seal, which has a main film substrate, said method comprising:
  (a) laying a sealant layer on said main film substrate, said sealant layer comprising:
     (i) an intermediate layer bonded to said main film substrate and having sufficient flow property under sealing conditions to deform and comply with all unfilled space between sealing jaws during sealing, and
     (ii) a sealing layer bonded to said intermediate layer to provide a seal under sealing conditions; and
  (b) providing a composite structure of said sealant layer to said main film substrate such that said intermediate layer has a composition different than said sealing layer's composition, and said sealant layer has sufficient thickness in relationship to the thickness of said main film substrate to eliminate tunnels from being formed during sealing, whereby hermetic seals are formed from said multi-layer film and seal characteristics are improved,
wherein the minimun thickness of said sealant layer in relationship to said main film substrate is determined by solving for $S_0$ in the following relationship:

$$S_0^3 = \left[\left(\frac{2.15}{96}\right)\left(\frac{LW}{L+W}\right)\left(\frac{G'}{T}\right)\right] t^2$$

and wherein, $S_0$ is said sealant layer thickness, t is total thickness of of said composite structure, G' is the storage shear modulus of said sealant layer (G' is temperature and rate dependent)

T is applied compression stress on a seal jaw,

L is ½ jaw seal length, and

W is a seal tooth width.

15. A method according to claim 14 wherein said main film substrate comprises at least one layer selected from the group consisting of oriented polypropylene, polypropylene, ethylene-propylene copolymer, polyethylene terephthalate, polyamide, polyacrylonitrile copolymer, polyvinylidene chloride, fluoro-polymer, ethylene-vinyl alcohol copolymer, and mixtures thereof.

16. A method according to claim 15 wherein said main film substrate further comprises a layer selected from the group consisting of barrier resins, tie resins, metallized film, ceramic deposited film, plasma chemical vapor deposited film, and metal, ceramic and plasma chemical vapor.

17. A method according to claim 16 wherein said main film substrate is a high barrier film.

18. A method according to claim 17 wherein said high barrier film is metallized.

19. A method according to claim 15 wherein said main film substrate is a laminate further comprising an outer web selected from the group consisting of paper, oriented polypropylene, polyethylene terephthalate, polyamide, polyethylene, and combinations thereof.

20. A method according to claim 14 wherein said sealant layer has a thickness of from about 15% to about 70% of said thickness of said composite structure.

21. A method according to claim 14 wherein said sealant layer has a thickness of from about 40% to about 60% of said thickness of said composite structure.

22. A method according to claim 14 wherein said thickness of said intermediate layer is from about 10% to about 90% of said thickness of said sealant layer.

23. A method according to claim 22 wherein said thickness of said intermediate layer is from about 40% to about 80% of said thickness of said sealant layer.

24. A method according to claim 14 wherein said intermediate layer comprises a component selected from the group consisting of polyethylene homo-, co-, terpolymers, amorphous nylon, an ionomer, and mixtures thereof.

25. A method according to claim 24 wherein said component is low density polyethylene.

26. A method according to claim 14 wherein said sealing layer comprises a component selected from the group consisting of polyethylene homo-, co-, and terpolymers, amorphous nylon, an ionomer, and mixtures thereof.

* * * * *

UNITED STATES PATENT AND TRADEMARK OFFICE
CERTIFICATE OF CORRECTION

PATENT NO. : 5,888,648
DATED : March 30, 1999
INVENTOR(S) : Kevin M. Donovan; Dan-Cheng Kong; Leland Liu; Donald F. Sexton; Tien-Kuei Su It is certified that error appears in the above-identified patent and that said Letters Patent is hereby corrected as shown below:

Column 17, line 24, delete "component is" and substitute therefor --"intermediate layer comprises"--;
Column 18, lines 51-52, delete "component is" and substitute therefore --"intermediate layer comprises"--;

Signed and Sealed this

Second Day of May, 2000

Attest:

*Attesting Officer*

Q. TODD DICKINSON

*Director of Patents and Trademarks*